(12) United States Patent
Balasubramonian et al.

(10) Patent No.: US 7,478,190 B2
(45) Date of Patent: Jan. 13, 2009

(54) MICROARCHITECTURAL WIRE MANAGEMENT FOR PERFORMANCE AND POWER IN PARTITIONED ARCHITECTURES

(75) Inventors: Rajeev Balasubramonian, Sandy, UT (US); Liqun Cheng, Salt Lake City, UT (US); John Carter, Salt Lake City, UT (US); Naveen Muralimanohar, Salt Lake City, UT (US); Karthik Ramani, Salt Lake City, UT (US)

(73) Assignee: University of Utah Technology Commercialization Office, Salt Lake City, UT (US)

( * ) Notice: Subject to any disclaimer, the term of this patent is extended or adjusted under 35 U.S.C. 154(b) by 312 days.

(21) Appl. No.: 11/351,528

(22) Filed: Feb. 10, 2006

(65) Prior Publication Data

US 2007/0192541 A1    Aug. 16, 2007

(51) Int. Cl.
 *G06F 13/00* (2006.01)
(52) U.S. Cl. ............... 710/316; 710/112; 711/118
(58) Field of Classification Search ......... 710/316–317; 711/118
See application file for complete search history.

(56) References Cited

OTHER PUBLICATIONS

Jan M. Rabaey; Anatha P. Chandrakasan; Borivoje Nikolic, Digital Integrated Circuits: A Design Perspective, 2003 2nd Ed. English Book XXII, Prentice-Hall, pp. 442, 443, 464 and 465.

*Primary Examiner*—Clifford H Knoll
(74) *Attorney, Agent, or Firm*—Holme Roberts & Owen LLP

(57) ABSTRACT

A method for utilizing heterogeneous interconnects comprising wires of varying latency, bandwidth and energy characteristics to improve performance and reduce energy consumption by dynamically routing traffic in a processor environment.

20 Claims, 13 Drawing Sheets

Steps involved in the modified cache pipeline

Fig 1: A 16-cluster processor with an interconnect where every link is composed of multiple wire types Fig 2: A 4-cluster system where each link consists entirely of 1 type of wire; each link can have a different type of wire Fig 6: Steps involved in the modified cache pipeline Fig 7: Read exclusive request for a block in shared state in a MESI protocol.

MICROARCHITECTURAL WIRE MANAGEMENT FOR PERFORMANCE AND POWER IN PARTITIONED ARCHITECTURES

BACKGROUND OF THE INVENTION

1. The Field of the Invention

The present invention pertains to computer architecture. More particularly, the present invention pertains to a heterogeneous interconnect design having wires with varying latency, bandwidth and energy characteristics.

2. The Relevant Technology

One of the biggest challenges for computer architects is the design of billion-transistor architectures that yield high parallelism, high clock speeds, low design complexity, and low power. In such architectures, communication over global wires has a significant impact on overall processor performance and power consumption. VLSI techniques allow a variety of potential wire implementations, but VLSI wire properties have never been exposed to microarchitecture design.

VLSI techniques enable a variety of different wire implementations. For example, by tuning the wire width and spacing, one may design wires with varying latency and bandwidth properties. Similarly, by tuning repeater size and spacing, one may design wires with varying latency and energy properties. Further, as interconnect technology develops, transmission lines may become feasible, enabling very low latency for very low-bandwidth communication. Data transfers on the on-chip network also have different requirements—some transfers benefit from a low latency network, others benefit from a high bandwidth network and still others are latency insensitive.

A partitioned architecture is but one approach to achieving the above mentioned design goals. Partitioned architectures consist of many small and fast computational units connected by a communication fabric. A computational unit is commonly referred to as a cluster and is typically comprised of a limited number of ALUs, local register storage and a buffer for instruction issue. Since a cluster has limited resources and functionality, it enables fast clocks, low power and low design effort. Abundant transistor budgets allow the incorporation of many clusters on a chip. The instructions of a single program are distributed across the clusters, thereby enabling high parallelism. Since it is impossible to localize all dependent instructions to a single cluster, data is frequently communicated between clusters over the inter-cluster communication fabric. Depending on the workloads, different types of partitioned architectures can utilize instruction-level, data-level, and thread-level parallelism (ILP, DLP, and TLP).

As computer architecture moves to smaller process technologies, logic delays scale down with transistor widths. Wire delays, however, do not scale down at the same rate. To alleviate the high performance penalty of long wire delays for future technologies, most design efforts have concentrated on reducing the number of communications through intelligent instruction and data assignment to clusters. However, for a dynamically scheduled 4-cluster system, performance degrades by approximately 12% when the inter-cluster latency is doubled. Thus, irrespective of the implementation, partitioned architectures experience a large number of global data transfers. Performance can be severely degraded if the interconnects are not optimized for low delay.

Since global communications happen on long wires with high capacitances, they are responsible for a significant fraction of on-chip power dissipation. Interconnect power is a major problem not only in today's industrial designs, but also in high-performance research prototypes. Computer architecture is clearly moving to an era where movement of data on a chip can have greater impact on performance and energy than computations involving the data—i.e., microprocessors are becoming increasingly communication-bound.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only one embodiment of the invention, and therefore are not to be considered in any way limiting of its scope. The invention will be described and explained with additional specificity and detail through the use of additional written description along with the accompanied drawings, in which.

BRIEF SUMMARY OF THE INVENTION

Figure 1:
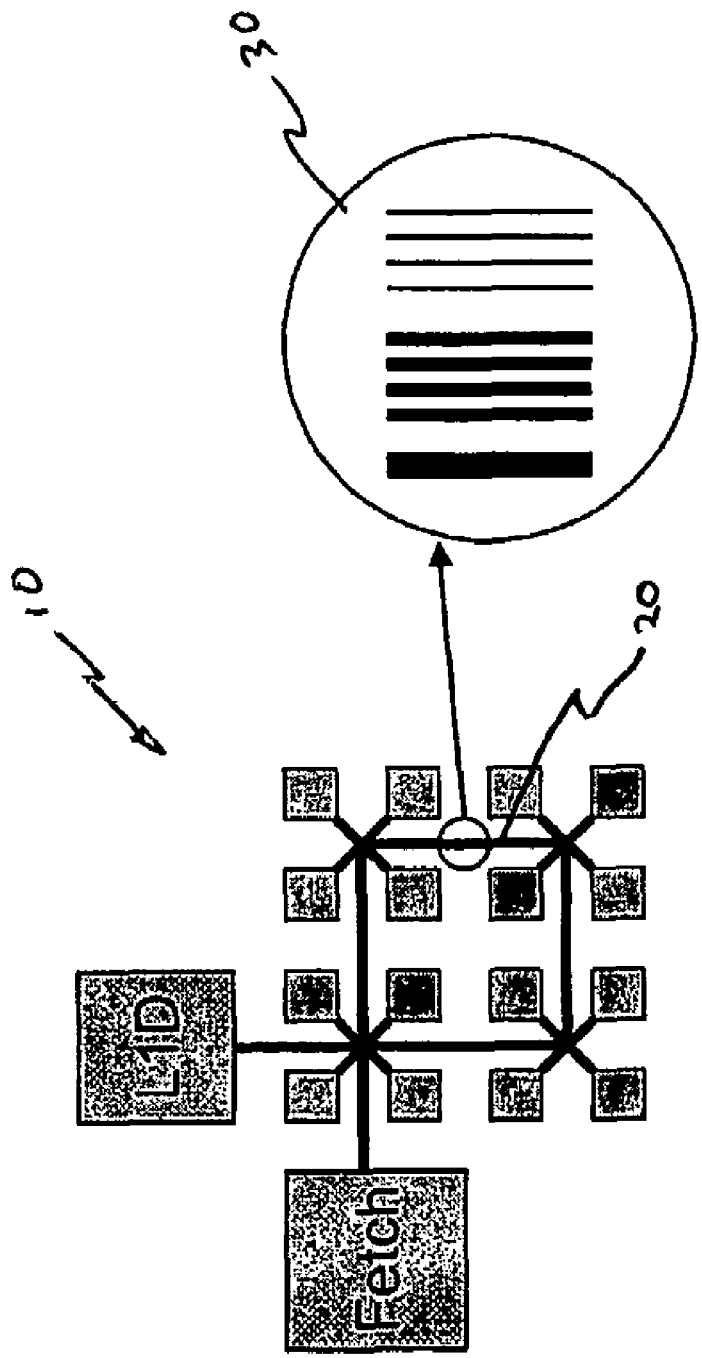
FIG. 1 illustrates a sixteen cluster processor with an interconnect having multiple conductor types.

The present invention is directed to a global wire management at the microarchitecture level using a heterogeneous interconnect that is comprised of wires with varying latency, bandwidth, and energy characteristics. Various microarchitectural techniques may be utilized that make use of such a heterogeneous interconnect to improve performance and reduce energy consumption. These techniques include a novel cache pipeline design, the identification of narrow bit-width operands, the classification of non-critical data and the detection of interconnect load imbalance. For such a dynamically scheduled partitioned architecture, the present invention results in significant reductions in overall processor ED² compared to a baseline processor that employs a homogeneous interconnect.

DETAILED DESCRIPTION OF THE PREFERRED EMBODIMENTS

Reference will now be made in detail to the preferred embodiments of the present invention, examples of which are illustrated in the accompanying drawings.

The delay of a wire is a function of the RC time constant (R is resistance and C is capacitance). The resistance per unit length of the wire can be expressed by the following equation:

$$R_{wire} = \frac{\rho}{(\text{thickness} - \text{barrier})(\text{width} - 2*\text{barrier})}$$

Thickness and width represent the geometrical dimensions of the wire cross-section, barrier represents the thin barrier layer around the wire to prevent copper from diffusing into surrounding oxide, and p is the material resistivity.

The capacitance per unit length can be modeled by four parallel-plate capacitors for each side of the wire and a constant for fringing capacitance:

$$C_{wire} = \epsilon_0(2K\epsilon_{horiz}\text{thickness/spacing} + 2\epsilon_{vert}\text{width/layerspacing}) + \text{fringe}(\epsilon_{horiz}, \epsilon_{vert})$$

The potentially different relative dielectrics for the vertical and horizontal capacitors are represented by $\epsilon_{horiz}$ and $\epsilon_{vert}$, K accounts for Miller-effect coupling capacitances spacing represents the gap between adjacent wires on the same metal layer, and layerspacing represents the gap between adjacent metal layers.

As can be seen from the equation for determining $R_{wire}$, increasing the width of the wire can significantly decrease resistivity, while also resulting in a modest increase in capacitance per unit length as determined from the equation for $C_{wire}$. Similarly, increasing the spacing between adjacent wires results in a drop in $C_{wire}$. By allocating more metal area per wire and increasing the wire width and spacing, the overall effect is that the product of $R_{wire}$ and $C_{wire}$ decreases, resulting in lower wire delays. The primary difference between wires in the different types of metal layers in modern processors, in addition to the thickness, is the wire width and spacing.

The resistance and capacitance of a wire are both linear functions of the wire length. Hence, the delay of a wire, that depends on the product of wire resistance and capacitance, is a quadratic function of wire length. A simple technique to overcome this quadratic dependence is to break the wire into multiple smaller segments and connect them with repeaters. As a result, wire delay becomes a linear function of wire length and depends on the number of segments, the wire delay across each segment and the logic delay across each repeater. Overall wire delay can be minimized by selecting optimal repeater sizes and spacing between repeaters. However, these repeaters have high overheads associated with them. Contacts have to be cut from the metal layer to the silicon substrate every time a logic element is introduced in the middle of a wire. The contacts and the transistors not only impose area overheads and routing constraints, but also impose high capacitive loads on the wires.

Energy in the interconnect can be reduced by employing repeaters that are smaller than the optimally-sized repeaters and by increasing the spacing between successive repeaters. This increases overall wire delay. Thus, repeater size and spacing are parameters that can dramatically influence interconnect power and performance.

In a transmission line, the wire delay is determined by the time taken to detect a voltage ripple on the wire. This delay is determined by the LC time constant and the velocity of the ripple, which is a function of the speed of light in the dielectric surrounding the interconnect. A transmission line, therefore, enables very low wire latencies. For a wire to operate as a transmission line, it must have very high width, thickness, horizontal and vertical spacing, and signal frequency. There are other implementation issues as well, such as the design of signal modulation and sensing circuits, reference planes above and below the metal layer, and shielding power and ground lines adjacent to each transmission line.

Heterogeneous Interconnects

A large number of different wire implementations are possible, either by varying properties such as wire width/spacing and repeater size/spacing, or by employing transmission lines. In one embodiment, inter-cluster global interconnects are designed to minimize delay for the transfer of 64-bit data and the associated tags. Wire widths for the base interconnect are chosen such that 72 wires can be accommodated in the available metal area and repeaters are sized and spaced to optimize delay. Wires having these characteristics are referred to as B-Wires. In addition to this base 72-bit interconnect (i.e. B-Wire), there are at least three other wire implementations that an interconnect architecture design may use:

P-Wires: Wires that are power-optimal. The wires have longer delays as they employ small repeater sizes and wide repeater spacing.

W-Wires: Wires that are bandwidth-optimal. The wires have minimum width and spacing and have longer delays.

L-Wires: Wires that are latency-optimal. These wires operate as transmission lines or employ very wide width and spacing and have low bandwidth (potentially, a network with fewer than 20 bits).

P-Wires and W-Wires can be combined to form a single wire implementation (referred to herein as PW-Wires) with minimum width and spacing, and with small repeater sizes and wide repeater spacing. Such wires have poor delay characteristics, but allow for low power and high bandwidth transmissions.

The wire implementations described above may be incorporated into an inter-cluster global interconnect in a variety of ways. The following illustrated topology is described with respect to FIG. 1. In the illustrated embodiment, each link on the network 10 offers the same degree of heterogeneity. For example, each link 20 may consist of 72 B-Wires, 144 PW-Wires, and 18 L-Wires, as depicted generally in the blown-up area 30. Thus, for any data transfer, the microarchitecture can dynamically choose to effect the transfer on a B-Wire, a PW-Wire or an L-Wire. It should be apparent to one of ordinary skill in the art that the illustrated example of FIG. 1 is but one of many possible topologies that may be utilized without departing from the intended scope of the invention.

Figure 2:
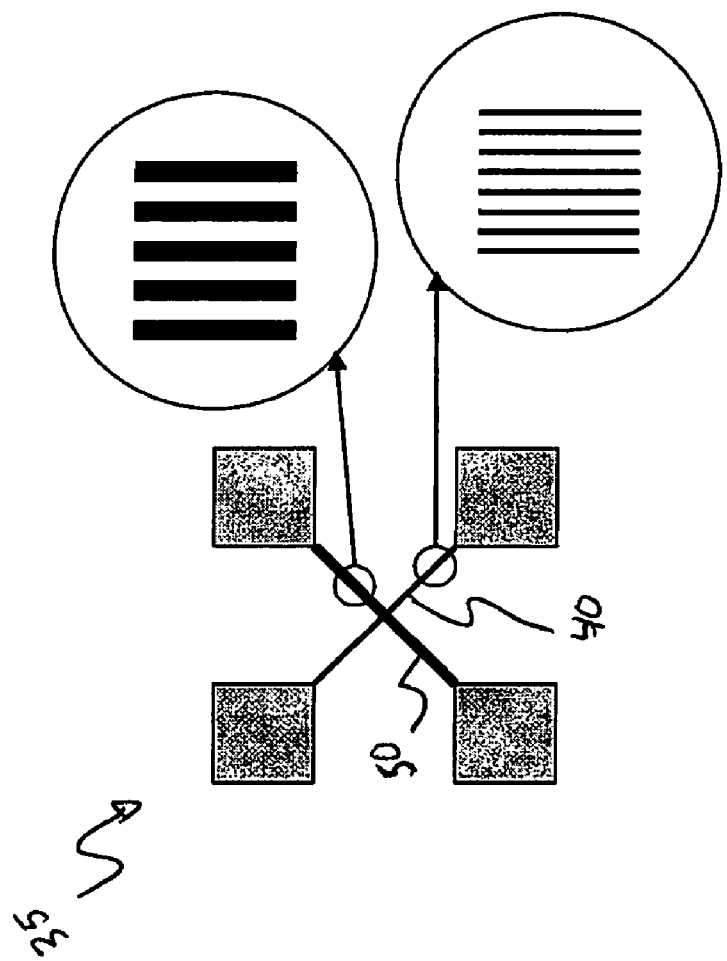
FIG. 2 illustrates a four cluster processor having each link comprised of the same conductor type.

Such an implementation choice may entail additional complexity within the send buffers. To reduce this complexity, one may design a topology 35 where a link 40 consist entirely of PW-Wires, while another link 50 consists entirely of B-Wires, as shown in FIG. 2. Such a topology 35 has lower design complexity, but affords less flexibility to the microarchitecture.

The additional logic to route data to one of three possible interconnects only requires one-to-three demultiplexers and compared to a base processor that already has multiple interconnects, the overhead is likely to be negligible. In any cycle, data can be dynamically assigned to one of the available wire implementations based on the needs of the particular program. The mechanisms for enabling this dynamic decision-making are discussed hereinafter.

Wire implementations may or may not be accommodated on a single metal layer. There are no technological barriers to having wires with different width/spacing or repeater size/spacing on a single metal layer. However, aspect ratio guidelines suggest that wire width can not be reduced beyond a certain limit. If the width and spacing for W-Wires or PW-Wires is lower than this limit, they may have to be implemented on a lower metal layer that has smaller thickness.

The Baseline Partitioned Architecture

In a partitioned architecture, instruction assignment to clusters may happen at compile-time or at run-time. There are advantages to either approach—static techniques entail lower hardware overheads and have access to more information on program dataflow, whereas dynamic techniques are more reactive to events such as branch mispredicts, cache misses and network congestion to name a few. The illustrated embodiment employs a dynamically scheduled partitioned architecture, however, it is contemplated that the illustrated embodiment described herein can be applied equally as well to statically scheduled architectures.

The illustrated partitioned architecture model dispatches a large window of in-flight instructions from a single-threaded application. A centralized cache implementation is used with the illustrated partitioned architecture given that a centralized cache offers nearly as much performance as a distributed cache while enabling low implementation complexity. A dynamic instruction steering heuristic assigns instructions to clusters, taking the following information into account: data dependences, cluster load imbalance, criticality of operands and proximity to the data cache.

Figure 3:
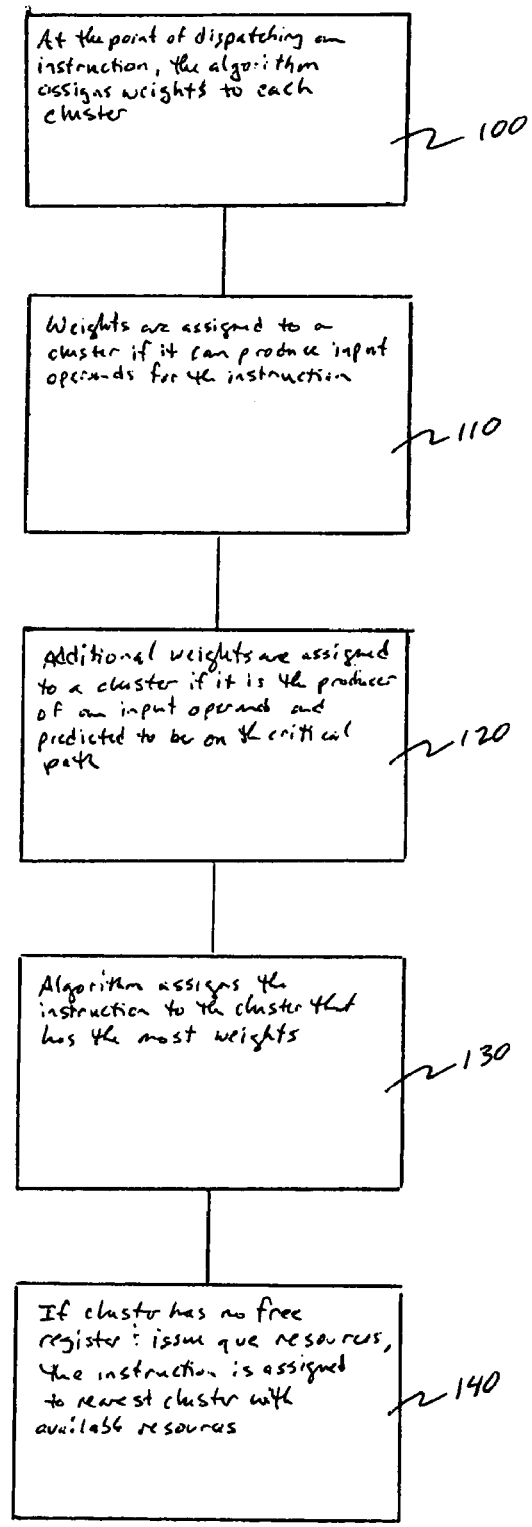
FIG. 3 shows a flow chart illustrating the operation of the steering heuristic FIG. 4 illustrate four clusters and a centralized data cache connected through a crossbar network.

FIG. 3 shows a flow chart illustrating the operation of one example of a steering heuristic. As shown in step 100, while dispatching an instruction, the steering heuristic or algorithm assigns weights to each cluster so as to identify the cluster that is most likely to minimize communication and issue-related stalls. Continuing with step 110, weights are assigned to a cluster if it can produce input operands for the instruction and if it has many empty issue queue entries. Additional weights are assigned to a cluster in step 120 if the cluster is the producer of the input operand that is predicted to be on the critical path for the instruction's execution. For loads, more weights are assigned to clusters that are closest to the data cache. As shown in step 130, the steering algorithm assigns the instruction to the cluster that has the most weights. Continuing with step 140, if that cluster has no free register and issue queue resources, the instruction is assigned to the nearest cluster with available resources.

Results produced within a cluster are bypassed to consumers in that cluster in the same cycle, while communicating the result to consumers in other clusters takes additional cycles. In order to effect the transfer of data between clusters, the instruction decode and rename stage inserts a "copy instruction" in the producing cluster that places the value on the inter-cluster network as soon as the value is made available. Each cluster has a scheduler for the inter-cluster network that is similar in organization to the issue queue and that has an issue bandwidth that matches the maximum number of transfers possible on each link of the network. Similar to the instruction wake-up process in conventional dynamic superscalars, the register tags for the operand are sent on the network ahead of the data so that the dependent instruction can be woken up and can consume the value as soon as it arrives.

Figure 4:
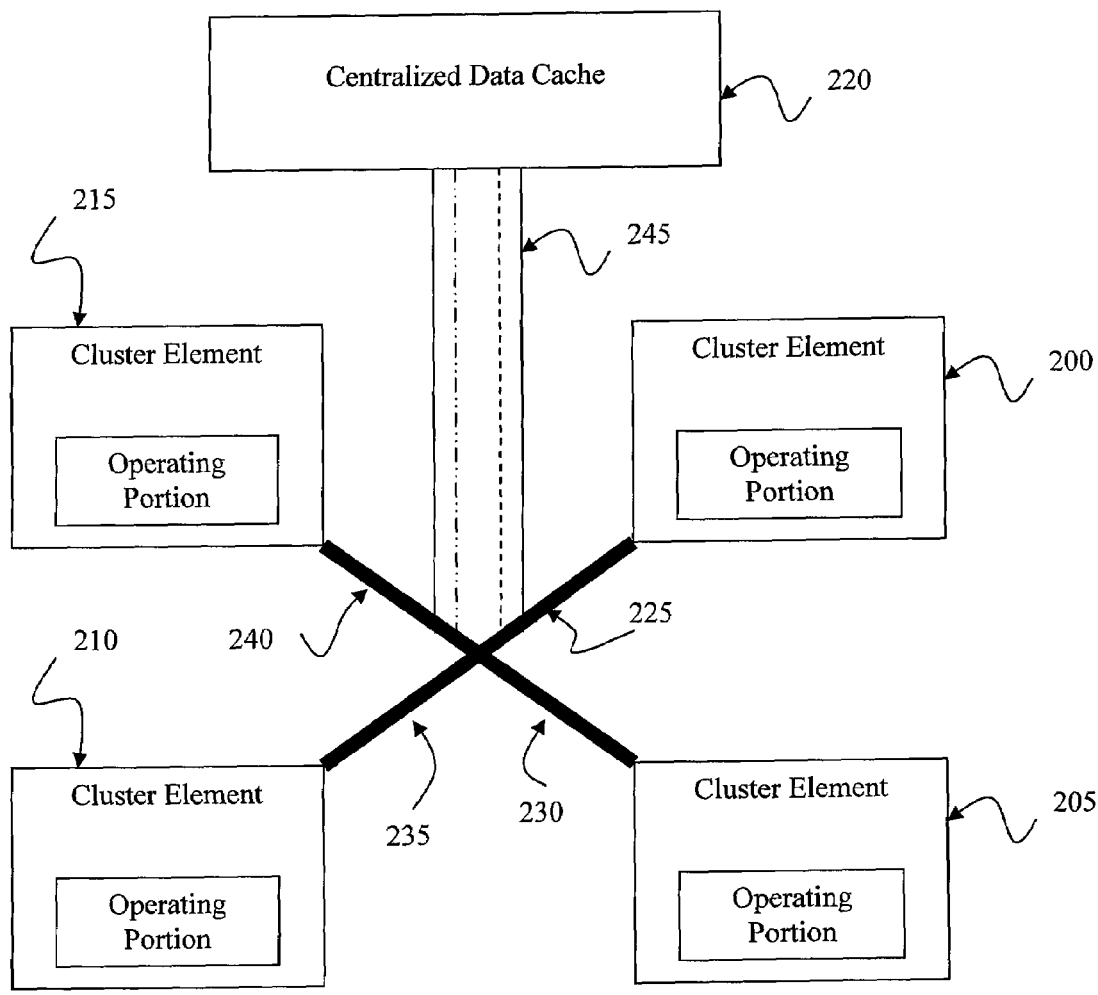

A processor 400 that has four clusters is described; however, any number of processor organizations may be used without departing from the intended scope of the present invention. Each of the four clusters 200, 205. 210, and 215 includes an operating portion. These four clusters 200, 205, 210, 215 and the centralized data cache 220 are connected through a crossbar network, as shown in FIG. 4. All links 225, 230, 235, 240, 245 contain a unidirectional interconnect in each direction. The processor illustrated in FIG. 4 adopts a heterogeneous interconnect, where every link in the network 225, 230, 235, 240, 245 is comprised of a combination of B-Wires, PW-Wires and L-Wires. For instance, the link from the centralized data cache 220 is representative of the links in the network, and is expanded to show a first conductor 247 that includes a set of wires (e.g., L-wires), a second conductor 249 that includes a set of wires (e.g., B-wires), and includes other conductors (e.g., a set of PW-wires). Each data transfer within the network has the option to use any one of these sets of wires.

For all processor organizations, the bandwidth requirements to the cache are much higher than bandwidth requirements to the clusters since more than one third of all instructions are loads or stores. Hence, the links going in and out of the cache are assumed to have twice as much area and twice as many wires as the links going in and out of a cluster. If multiple transfers compete for a link in a cycle, one transfer is effected in that cycle, while the others are buffered. In the present illustrated embodiment, unbounded buffers at each node of the network are utilized.

Figure 5:
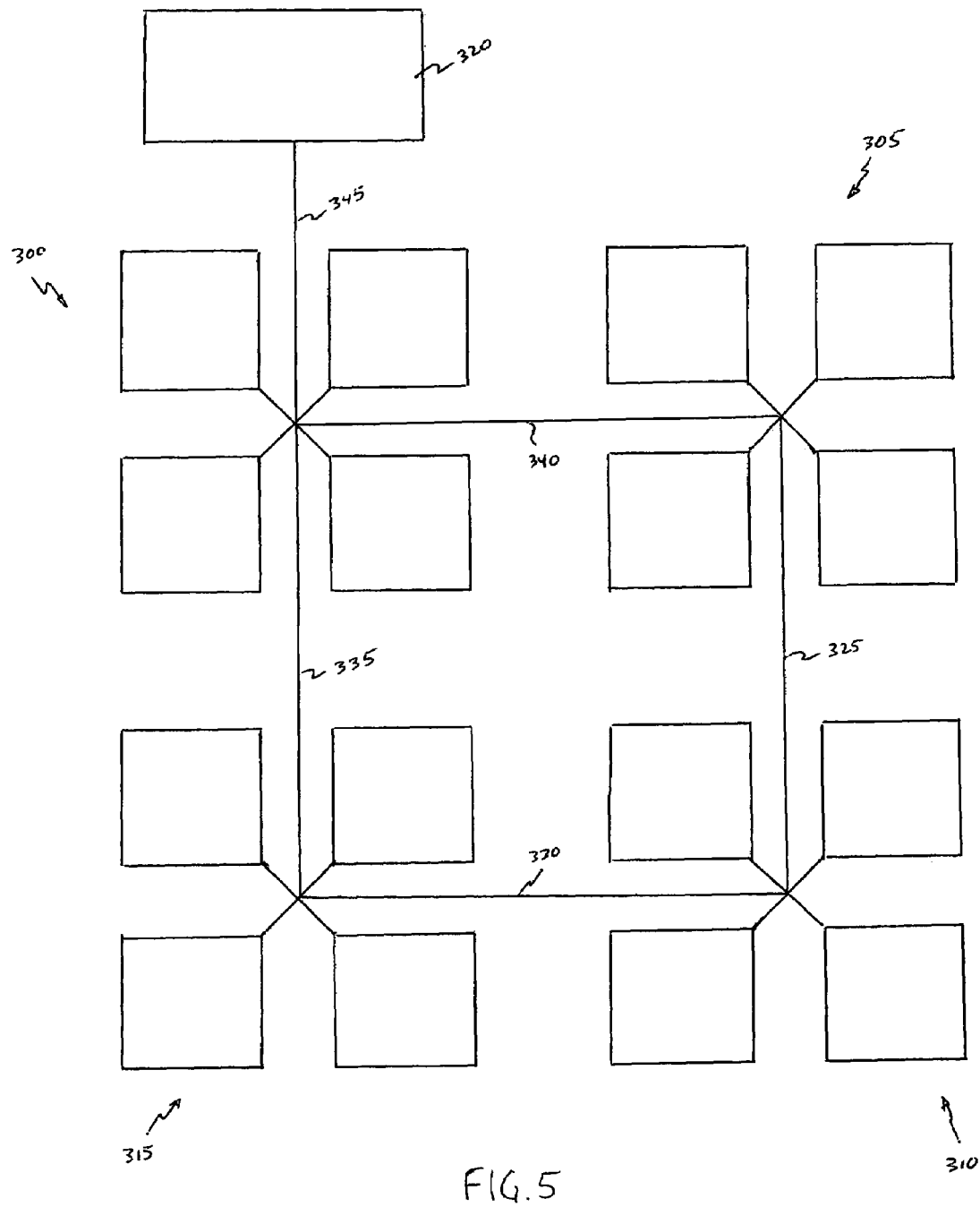
FIG. 5 illustrates a processor model with 16 clusters.

FIG. 5 illustrates a processor model with 16 clusters. As shown in FIG. 5, a set of four clusters 300, 305, 310, 315 and the centralized data cache 320 is connected through a crossbar network 325, 330, 335, 340, 345, allowing low-latency communication to neighboring clusters. As shown in FIG. 5, the crossbars are connected with a ring topology. Similar to the 4-cluster system, every link in the network, including the links within the four clusters 300, 305, 310, 315 themselves, is comprised of wires with different properties.

Accelerating Cache Access

Low-latency, low-bandwidth L-Wires can be utilized to improve performance. L-Wires are designed by either employing very large wire widths and spacing or by implementing transmission lines. In the illustrated example, because of the area overhead, 18 L-Wires occupy approximately the same metal area as 72 B-Wires. Now, consider the behavior of the cache pipeline in the baseline processor. When a cluster executes a load instruction, it computes the effective address and communicates it to the centralized load/store queue (LSQ) and cache. The load/store queue waits until it receives addresses of stores prior to the load in program order, guarantees that there is no memory dependence and then initiates the cache access. The cost of communication to the cache influences load latency in two ways—(1) it delays the arrival of load addresses at the LSQ, and (2) it delays the arrival of store addresses at the LSQ, thereby delaying the resolution of memory dependences.

Figure 6:
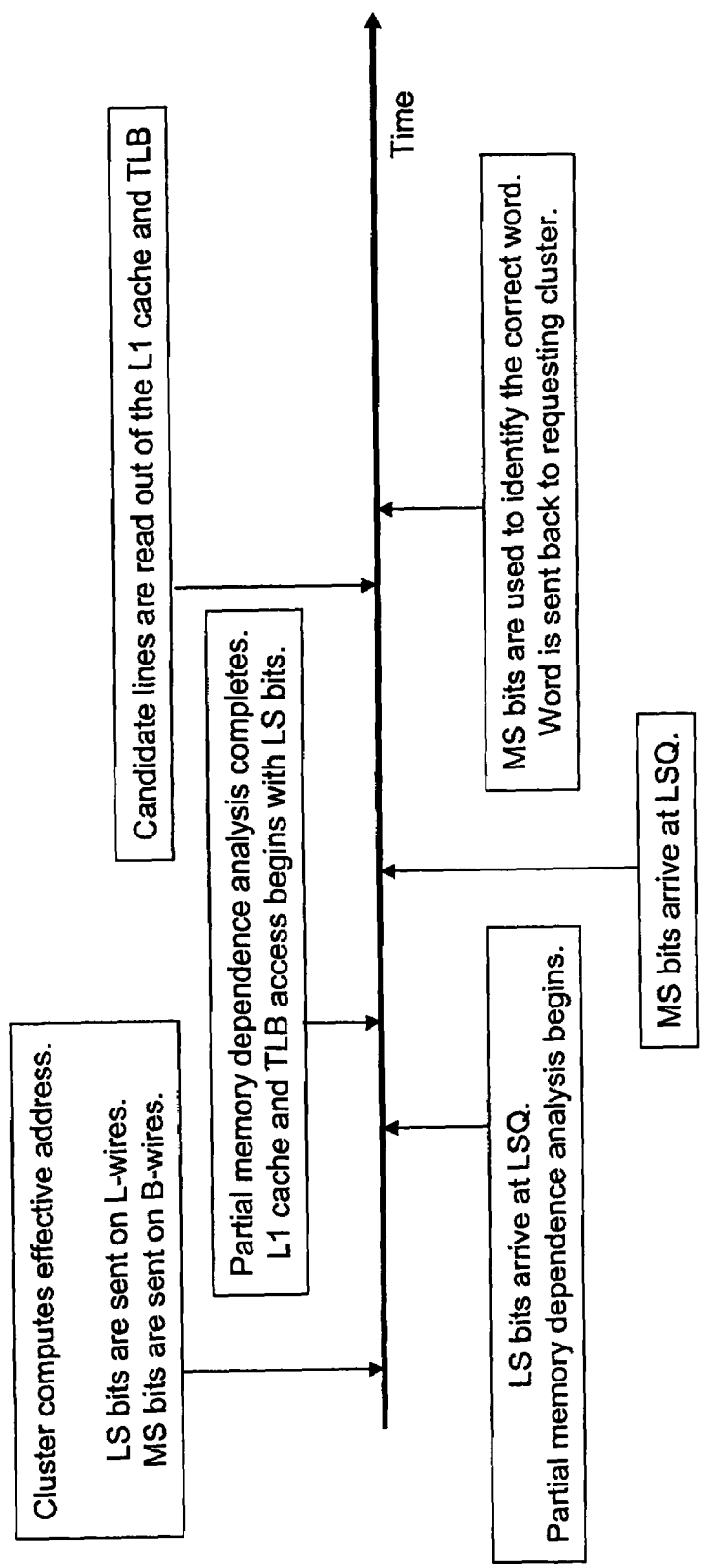
FIG. 6 is a flowchart illustrating the accelerating cache process.

To accelerate cache access, the following technique is utilized and described with respect to the flow chart of FIG. 6. A subset of the address bits are transmitted on low-latency L-Wires to prefetch data out of the L1 cache and hide the high communication cost of transmitting the entire address. After the cluster computes the effective address, the least significant (LS) bits of the address are transmitted on the low-latency L-Wires, while the most significant (MS) bits are transmitted on B-Wires. The same happens for store addresses. Thus, the LSQ quickly receives the LS bits for loads and stores, while the MS bits take much longer. The early arrival of the partial addresses allows the following optimizations.

The LSQ can effect a partial comparison of load and store addresses with the available LS bits. If the LS bits of the load do not match the LS bits of any earlier store, the load is guaranteed to not have any memory dependence conflicts and it can begin cache access. If the LS bits of the load match the LS bits of an earlier store, it has to wait for the MS bits to arrive before determining if there is a true dependence. A large number of false dependences can also increase contention for the LSQ ports.

To effect an L1 data cache access, the least significant bits of the effective address are used to index into the data and tag RAM arrays and read out a relevant set of cache blocks. The most significant bits of the effective address are used to index into the translation look-aside buffer (TLB). The TLB stores recent virtual-to-physical address translations and is typically accessed in parallel with the L1 data cache. The resulting translation is then compared with the tags to select the appropriate data block and forward it to the cluster. Since the accesses to the cache RAM arrays do not require the most significant bits, the accesses can be initiated as soon as the least significant bits of the address arrive on L-Wires.

Similarly, a few bits of the virtual page number can be included in the transfer on the L-Wires. This allows TLB access to proceed in parallel with RAM array look-up. The modifications to enable indexing with partial address information are more significant for a content addressable memory (CAM) structure than a RAM structure. Hence, a highly-associative TLB design may be more amenable to this modified pipeline than a fully-associative one. When the rest of the effective address arrives, tag comparison selects the correct translation from a small subset of candidate translations.

Thus, the transfer of partial address bits on L-Wires enables data to be prefetched out of L1 cache and TLB banks and hide the RAM access latency, which is the biggest component in cache access time. If the cache RAM access has completed by the time the entire address arrives, only an additional cycle is spent to detect the correct TLB translation and effect the tag comparison before returning data to the cluster. This overlap of effective address transfer with cache RAM and TLB access can result in a reduction in effective load latency if the latency difference between L-Wires and B-Wires is significant.

It should be appreciated that the proposed pipeline works well and yields speedups even if the processor implements some form of memory dependence speculation. The partial address can proceed straight to the L1 cache and prefetch data out of cache banks without going through partial address comparisons in the LSQ if it is predicted to not have memory dependences. To allow cache and TLB index bits to fit in a narrow low-bandwidth interconnect, it might be necessary to make the cache and TLB highly set-associative. In one example, 18 L-Wires can accommodate 6 bits of tag to identify the instruction in the LSQ, 8 index bits for the L1 data cache and 4 index bits for the TLB. For the assumed cache and TLB sizes, this corresponds to an associativity of 4 and 8 for the cache and TLB, respectively. If the associativity is reduced, a few more L-Wires may be needed.

Figure 8:
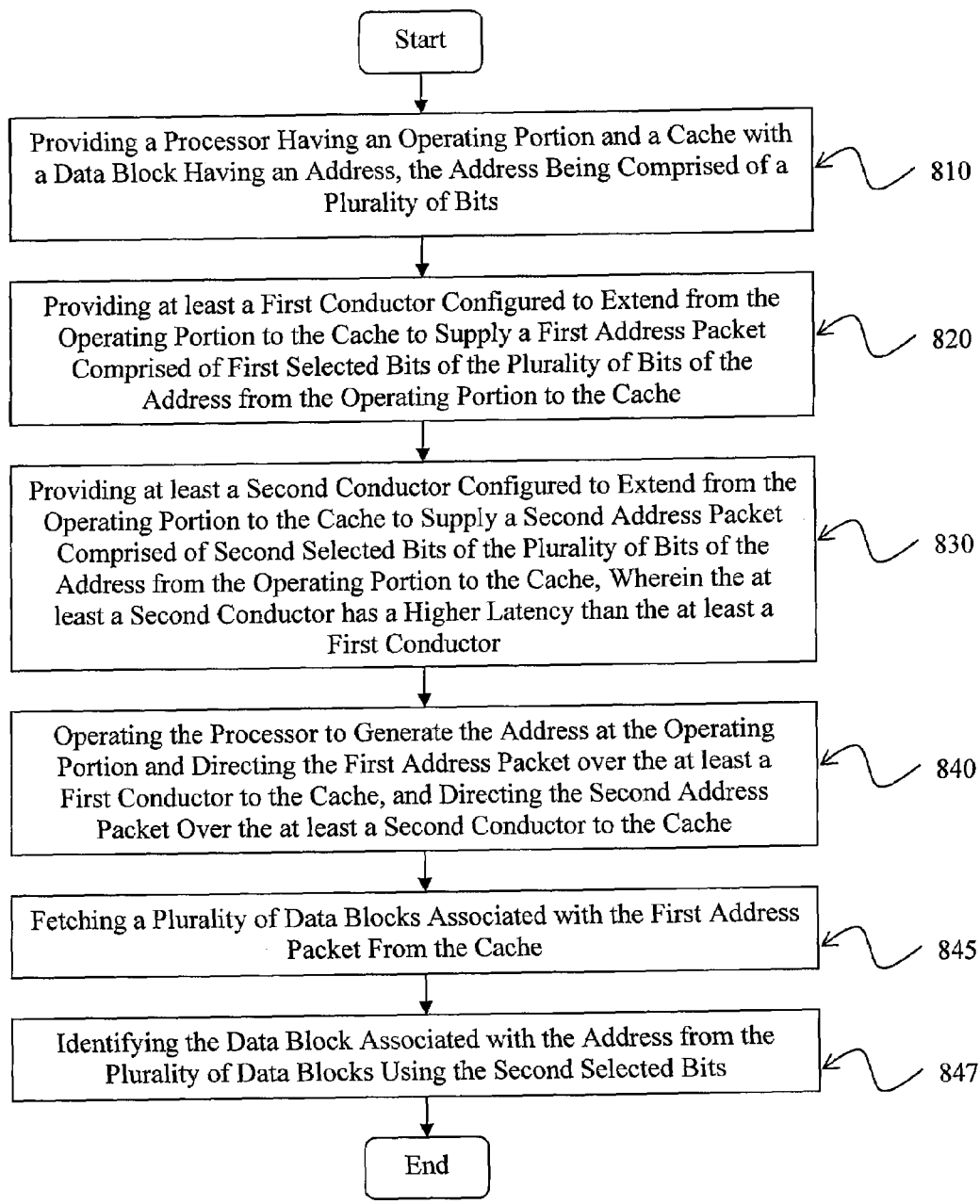
FIG. 8 is a flow diagram illustrating steps in a method for routing traffic, in accordance with one embodiment of the present invention.

FIG. 8 is a flow diagram 800 illustrating steps in a method for routing traffic, in accordance with one embodiment of the present invention. Specifically, at 810, a processor is provided having an operating portion and a cache. The cache includes a data block associated with an address, wherein the address is comprised of a plurality of bits. At 820, at least a first conductor is provided that is configured to extend from the operating portion to the cache to supply a first address packet from the operating portion to the cache. The first address packet is comprised of first selected bits of the plurality of bits of the address. At 830, at least a second conductor is provided that is connected to extend from the operating portion to the load/store queue to supply a second address packet address from the operating portion to the cache. The second address packet is comprised of second selected bits of the plurality of bits of the address. In addition, the at least a second conductor has a higher latency than the at least a first conductor. At 840, the processor is operated to generate the address at the operating portion. In addition, the processor is operated at 840 to direct the first address packet over the at least a first conductor to the cache. Also, the processor is operated at 840 to direct the second address packet over the at least a second conductor to the cache. At 845, the cache is operated to fetch a plurality of data blocks stored in the cache, wherein the plurality of data blocks are associated with the first address packet. At 847, the cache is operated to identify the data block associated with the address from the plurality of data blocks using the second selected bits.

Figure 9:
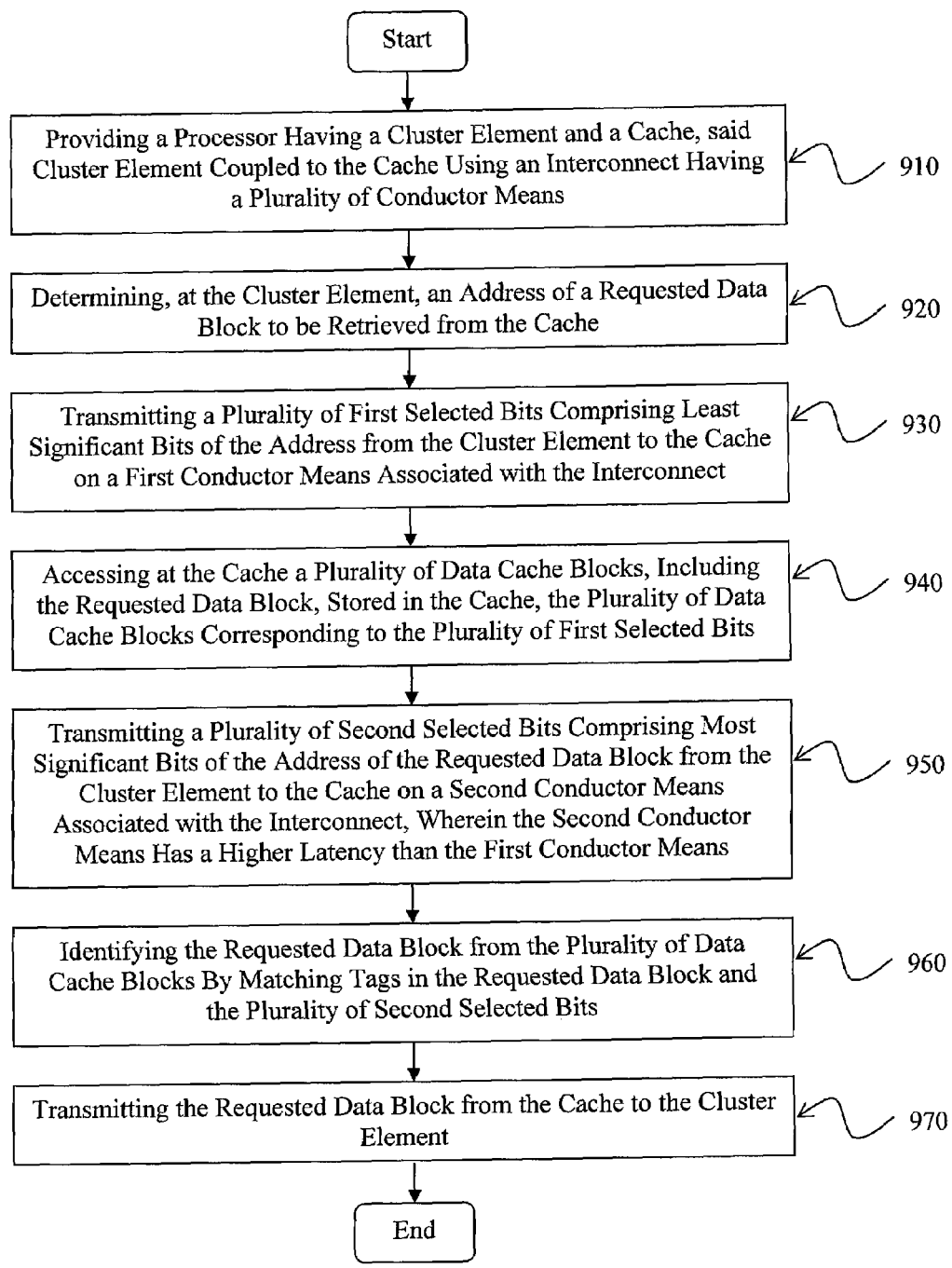
FIG. 9 is a flow diagram illustrating steps in a method for routing traffic, in accordance with one embodiment of the present invention.

FIG. 9 is a flow diagram 900 illustrating steps in a method for routing traffic, in accordance with one embodiment of the present invention. Specifically, at 910, a processor is provided having a cluster element and a cache. The cluster element is coupled to the cache using an interconnect having a plurality of conductor means. At 920, an address of a requested data block to be retrieved from the cache is determined at the cluster element. At 930, a plurality of first selected bits is transmitted from the cluster element to the cache on a first conductor means associated with the interconnect. The first selected bits comprises a first subset of the address. At 940, at the cache, a plurality of data cache blocks is accessed. The plurality of data cache blocks includes the requested data block. The plurality of data cache blocks corresponds to the plurality of first selected bits. At 950, a plurality of second selected bits is transmitted from the cluster element to the cache on a second conductor means associated with the interconnect. The plurality of second selected bits comprises most significant bits of the address of the requested data block. At 960, the requested data block is identified from the plurality of data cache blocks using the plurality of second selected bits. In particular, the requested data block is identified by matching tags in the requested data block that is accessed from cache and the plurality of second selected bits. At 970, the requested data block is transmitted from the cache to the cluster element.

Narrow Bit-Width Operands

An interconnect composed of L-Wires can also be employed for results that can be encoded by a few bits. 18 L-Wires can accommodate eight bits of register tag and ten bits of data. The simplest form of data compaction is used—integer results between 0 and 1023 are eligible for transfer on L-Wires. The hardware required to detect narrow bit-width data can be easily implemented—in one embodiment, the PowerPC 603 has hardware to detect the number of leading zeros that is then used to determine the latency for integer multiply. A special case in the transfer of narrow bit-width data is the communication of a branch mispredict back to the front-end. This only involves the branch ID that can be easily accommodated on L-Wires, thereby reducing the branch mispredict penalty.

In order to schedule a wake-up operation at the consuming cluster, the register tags are sent before the data itself. For a narrow bit-width operand, the tags have to be sent on L-Wires.

Hence, the pipeline requires advance knowledge of whether the result can be expressed in 10 bits. An implementation would utilize an inspection of the instruction's input operands or a simple predictor. It has been confirmed that a predictor with 8K 2-bit saturating counters, that predicts the occurrence of a narrow bit-width result when the 2-bit counter value is three, is able to identify approximately 95% of all narrow bit-width results. With such a high-confidence predictor, only 2% of all results predicted to be narrow have bit widths greater than 10.

Figure 10:
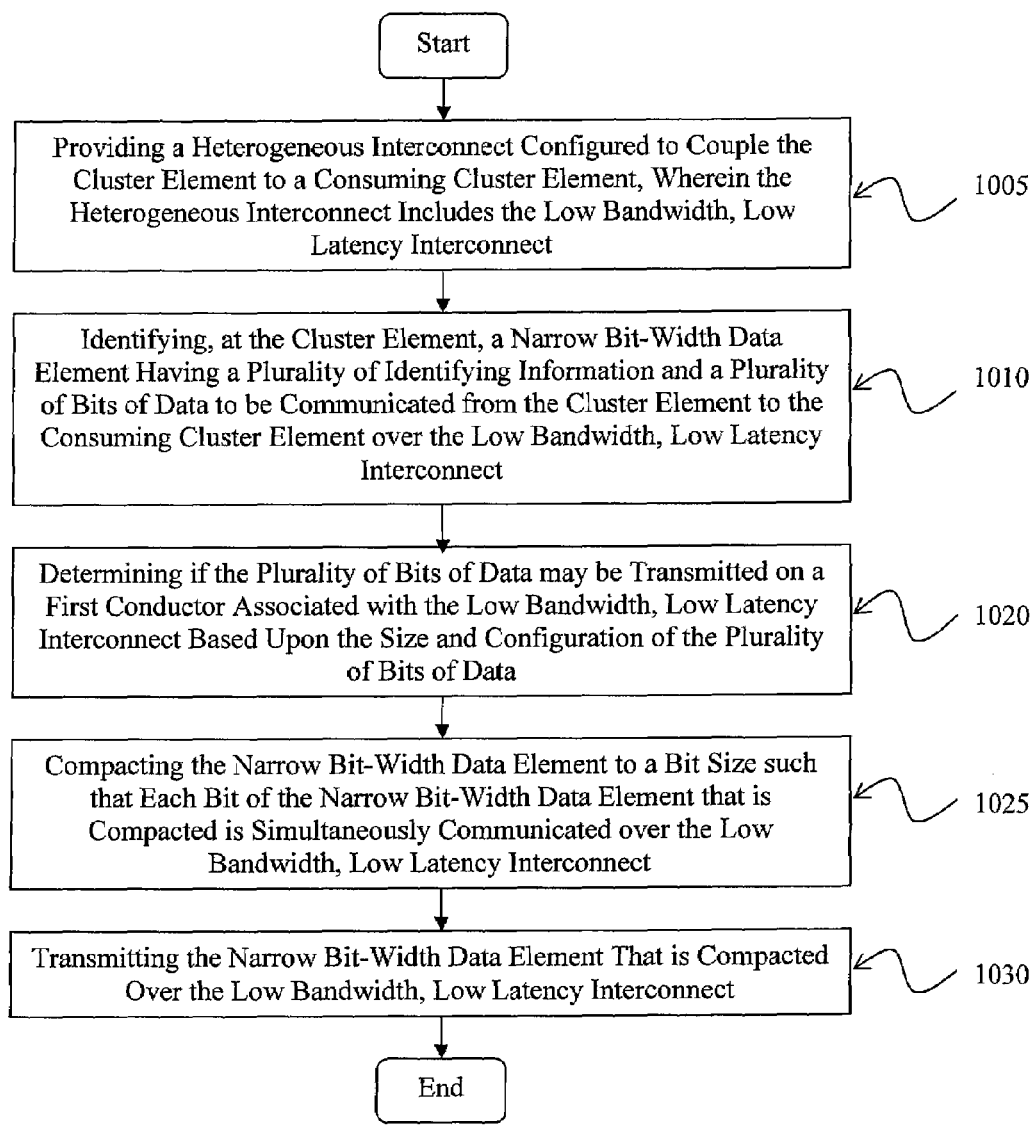
FIG. 10 is a flow diagram illustrating steps in a method for routing traffic from a cluster element over a low bandwidth, low latency interconnect in a processor, in accordance with one embodiment of the present invention.

FIG. 10 is a flow diagram 1000 illustrating steps in a method for routing traffic from a cluster element over a low bandwidth, low latency interconnect in a processor, in accordance with one embodiment of the present invention. Specifically, at 1005, a heterogeneous interconnect is provided that is configured to coupled the cluster element to a consuming cluster element. The heterogeneous interconnect comprises the low bandwidth, low latency interconnect. At 1010, a narrow bit-width element is identified at the cluster element. The narrow bit-width element includes a plurality of identifying information and a plurality of bits of data to be communicated from the cluster element to the consuming cluster element over the low bandwidth, low latency interconnect. At 1020, it is determined if the plurality of bits of data may be transmitted on a first conductor associated with the low bandwidth, low latency interconnect, based upon the size and configuration of the plurality of bits of data. At 1025, the narrow bit-width data element is compacted to a bit size such that each bit of the narrow bit-width data element that is compacted is simultaneously communicated over the low bandwidth, low latency interconnect. At 1030, the narrow bit-width data element that is compacted is transmitted over the low bandwidth, low latency interconnect.

Exploiting PW-Wires

PW-Wires may be used to not only reduce contention in other wires, but also reduce energy consumption. Accordingly, the objective is to identify those data transfers that can tolerate the higher latency of these wires or to identify situations when the cost of contention on B-Wires offsets its wire latency advantage. If a data transfer has the choice of using either B-Wires or PW-Wires, the following three criteria dictate when a transfer can be effected on the high bandwidth, low energy, high latency PW-Wires:

Criteria 1: If the input operands are already ready in a remote register file at the time an instruction is dispatched, the operands are transferred to the instruction's cluster on PW-Wires.

Criteria 2: Store data is assigned to PW-Wires.

Criteria 3: The amount of traffic injected into either interconnect in the past N cycles is monitored. If the difference between the traffic in each interconnect exceeds a certain pre-specified threshold during the N cycles, subsequent data transfers are steered to the less congested interconnect.

Thus, by steering non-critical data towards the high bandwidth, energy-efficient interconnect, there is little performance degradation. Moreover, by steering data away from the congested interconnect, there is potential performance improvements. Accordingly, large savings in interconnect energy may be observed.

Figure 11:
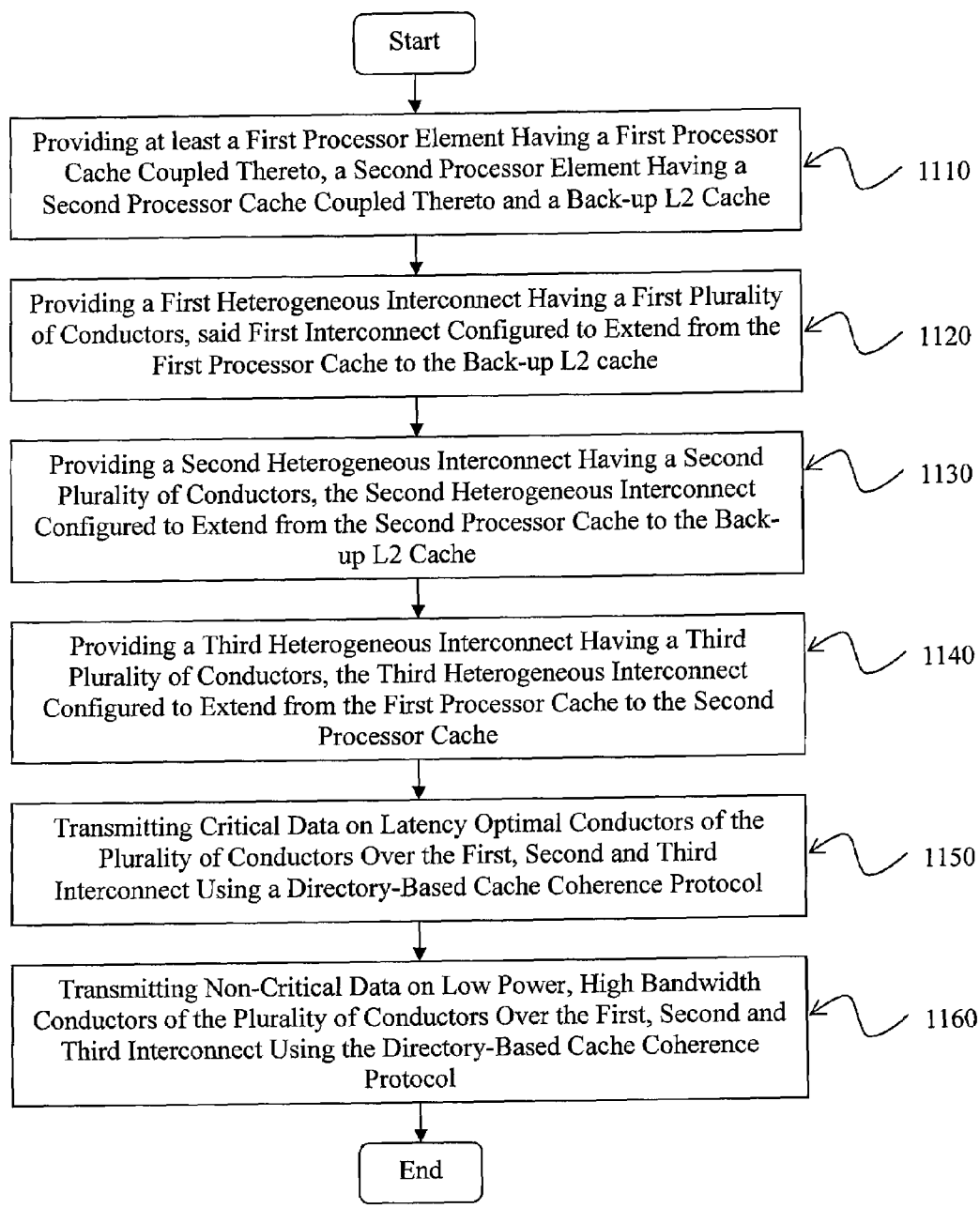
FIG. 11 is a flow diagram illustrating steps in a method for routing traffic in a multi-processor environment, in accordance with one embodiment of the present invention.

FIG. 11 is a flow diagram 1100 illustrating steps in a method for routing traffic in a multi-processor environment, in accordance with one embodiment of the present invention. Specifically, at 1110, at least a first processor element, a second processor element, and a back-up L2 cache are provided in a configuration similar to that provided in FIG. 7. The first processor element includes a first processor cache coupled thereto, and the second processor element includes a second processor cache coupled thereto and a back-up L2 cache. At 1120, a first heterogeneous interconnect having a first plurality of conductors is provided. The first heterogeneous interconnect is configured to extend from the first processor cache to the back-up L2 cache. At 1130, a second heterogeneous interconnect is provided that includes a second plurality of conductors. The second heterogeneous interconnect is configured to extend from the second processor cache to the back-up L2 cache. At 1140, a third heterogeneous interconnect is provided having a third plurality of conductors. The third heterogeneous interconnect is configured to extend from the first processor cache to the second processor cache. At 1150, critical data is transmitted on latency optimal conductors of the plurality of conductors over the first, second and third interconnect using a directory-based cache coherence protocol. At 1160, non-critical data is transmitted on low power, high bandwidth conductors from said plurality of conductors over the first, second and third interconnect using the directory-based cache coherence protocol.

Figure 12:
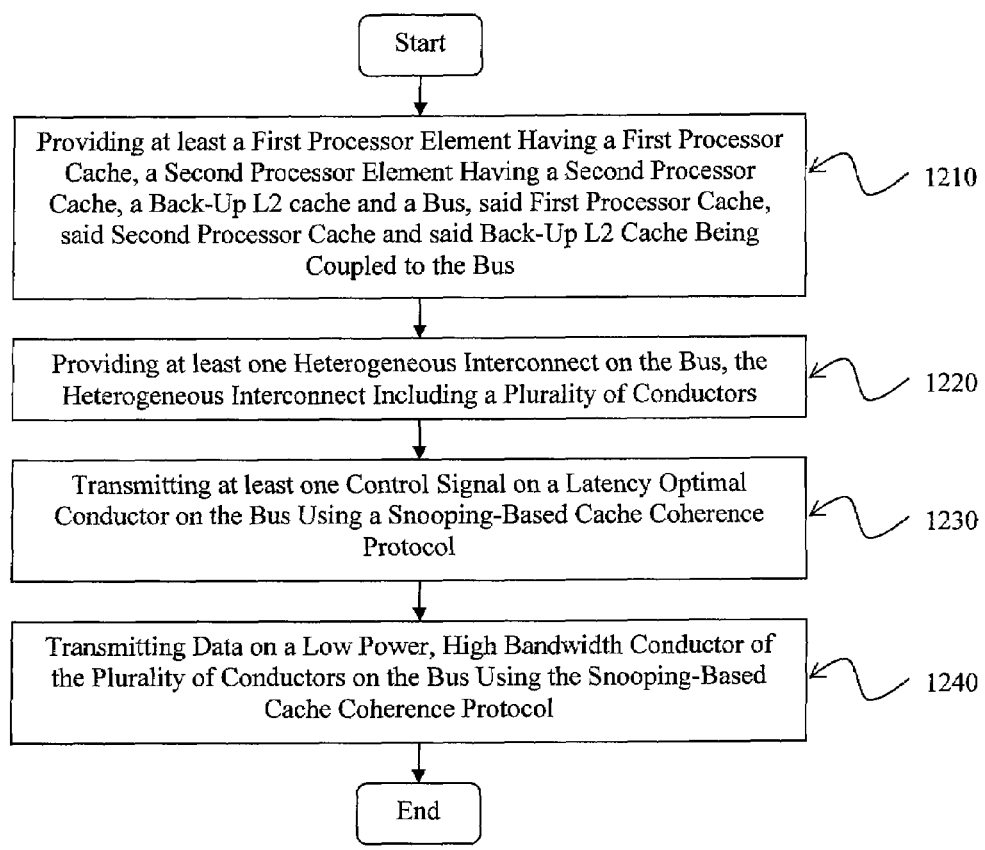
FIG. 12 is a flow diagram illustrating steps in a method for routing traffic in a multi-processor environment, in accordance with one embodiment of the present invention.
Figure 13:
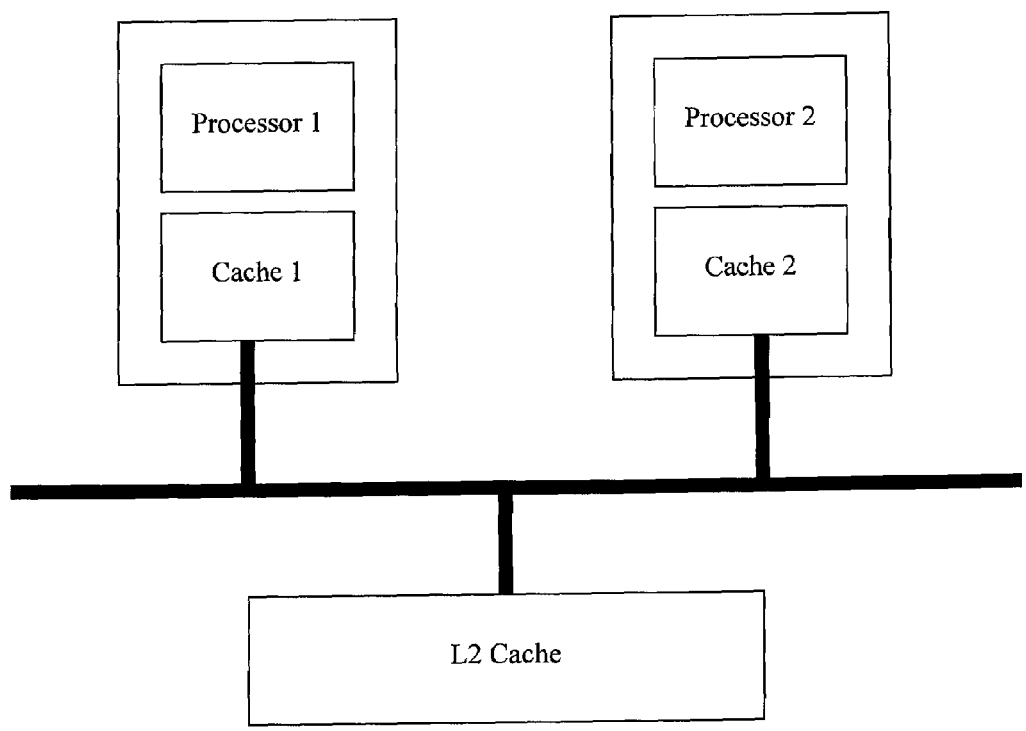
FIG. 13 is a block diagram of a multiprocessor environment configured to communicate over a bus-based design, in accordance with one embodiment of the present invention.

FIG. 12 is a flow diagram 1200 illustrating steps in a method for routing traffic in a multi-processor environment, in accordance with one embodiment of the present invention. Specifically, at 1210, at least a first processor element, a second processor element, a back-up L2 cache, and a bus are provided in a configuration similar to that provided in FIG. 13. The first processor element includes a first processor cache coupled thereto, and the second processor element includes a second processor cache coupled thereto. At 1220, at least one heterogeneous interconnect on the bus is provided. The heterogeneous interconnect includes a plurality of conductors. At 1230, at least one control signal is transmitted on a latency optimal conductor on the bus using a snooping-based cache coherence protocol. At 1240, data is transmitted on a low power, high bandwidth conductor the plurality of conductors on the bus using the snooping based cache coherence protocol.

Protocol Dependent Optimization of Coherence Traffic

The following description briefly describes the characteristics of coherence operations in both directory-based and snooping bus-based coherence protocols and then how coherence operations may be mapped to the appropriate set of wires. In a bus-based design, the ability of a cache to directly respond to another cache's request leads to low L1 cache-to-cache miss latencies. L2 cache latencies are relatively higher as a processor core has to acquire the bus before sending the request to L2. It is difficult to support a large number of processor cores with a single bus due to the bandwidth and electrical limits of a centralized bus. In a directory-based design, each L1 connects to the L2 cache through a point-to-point link. This design has low L2 hit latency and scales better. However, each L1 cache-to-cache miss must be forwarded by the L2 cache, which implies high L1 cache-to-cache latencies. The performance comparison between these two design choices depends on the cache size, miss rate, number of outstanding memory requests, working-set size and sharing behavior of the targeted benchmarks to name a few. Either option may be attractive to chip manufacturers.

Write-Invalidate Directory-Based Protocol

Write-invalidate directory-based protocols have been implemented in existing dual-core CMPs and will likely be used in larger scale CMPs as well. In a directory-based protocol, every cache line has a directory where the states of the block in all L1s are stored. Whenever a request misses in an L1 cache, a coherence message is sent to the directory at the L2 to check the cache line's global state. If there is a clean copy in the L2 and the request is a READ, it is served by the L2 cache. Otherwise, another L1 must hold an exclusive copy and the READ request is forwarded to the exclusive owner, which supplies the data. For a WRITE request, if any other L1 cache holds a copy of the cache line, coherence messages are sent to each of them requesting that they invalidate their copies. When each of these invalidation requests is acknowledged, the L2 cache can supply an exclusive copy of the cache line to the requesting L1 cache.

Hop imbalance is quite common in a directory-based protocol. To exploit this imbalance, it is desirable to send critical messages on fast wires to increase performance and non-critical messages on slow wires to save power. For purposes of describing the current invention, it is assumed that the hop latencies of different wires are in the following ratio: L-wire : B-wire : PW-wire :: 1:2:3.

Read Exclusive Request for Block in Shared State

Figure 7:
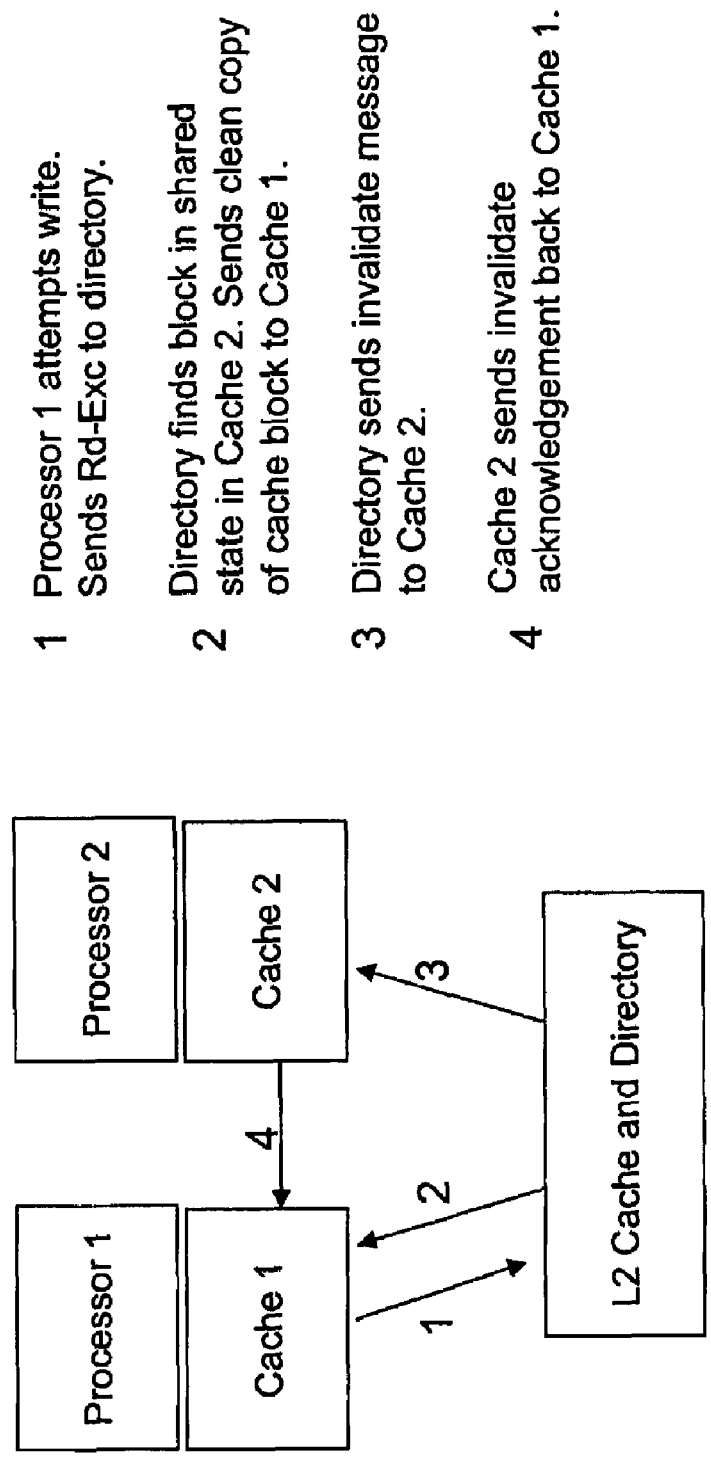
FIG. 7 shows the generated messages for a read exclusive request for a data block in shared state.

FIG. 7 illustrates the generated messages for a read exclusive request for a data block in shared state. In the case of a read exclusive request for a data block in a shared state, the L2 cache's copy is clean. Accordingly, the L2 cache provides the data to the requesting L1 and invalidates all shared copies. When the requesting L1 receives the reply message from the L2, it collects invalidation acknowledgment messages from the other L1s before returning the data to the processor core.

As shown in FIG. 7, the reply message from the L2 takes only one hop, while the invalidation acknowledgment messages take two hops. This example illustrates hop imbalance. Since there is no benefit to receiving the cache line early, latencies for each hop can be chosen that equalize communication latency for the cache line and the acknowledgment messages. Acknowledgment messages include identifiers so they can be matched against the outstanding request in the L1's missed status holding register (MSHR). Since there are only a few outstanding requests in the system, the identifier requires few bits, allowing the acknowledgment to be transferred on low-bandwidth low-latency L-Wires. Simultaneously, the data block transmission from the L2 can happen on low-power PW-Wires and still finish before the arrival of the acknowledgments. Since acknowledgments are often on the critical path, this strategy improves performance. Power consumption is also reduced because the data block is transferred on power-efficient wires.

Read Request for Block in Exclusive State

In the case of a read request for block in exclusive state, the value in the L2 is likely to be "stale" and the following protocol actions are taken. The L2 cache sends a speculative data reply to the requesting L1 and forwards the read request as an intervention message to the exclusive owner. If the cache copy in the exclusive owner is "clean", an acknowledgment message is sent to the requesting L1 indicating that the speculative data reply from the L2 is valid. If the cache copy is "dirty", a response message with the latest data is sent to the requesting L1 and a write-back message is sent to the L2. Since the requesting L1 cannot proceed until it receives a message from the exclusive owner, the speculative data reply from the L2 (a single hop transfer) can be sent on slower PW-Wires. The forwarded request to the exclusive owner is on the critical path, but includes the block address. It is therefore not eligible for transfer on L-Wires. If the owner's copy is in the exclusive clean state, a low-bandwidth acknowledgment to the requestor can be sent on L-Wires. If the owner's copy is "dirty", the cache block can be sent over B-Wires, while the low priority writeback to the L2 can happen on PW-Wires. With the above described mapping, the critical path is accelerated using faster L-Wires, while simultaneously lowering power consumption by sending non-critical data on PW-Wires. The above protocol actions may apply when a read-exclusive request is made for a block in the exclusive state.

NACK Messages

When the directory state is busy, incoming requests are often "NACKed" by the home directory, i.e., a negative acknowledgment ("NACK") is sent to the requester rather than buffering the request. Typically the requesting cache controller reissues the request and the request is serialized in the order in which it is actually accepted by the directory. A NACK message can be matched by comparing the request id (MSHR index) rather than the full address. Accordingly, a NACK is eligible for transfer on low-bandwidth L-Wires. When network contention is low, the home node should be able to serve the request when it arrives again, in which case sending the NACK on fast L-Wires can improve performance. In contrast, when network contention is high, frequent backoff-and-retry cycles are experienced. However, fast NACKs only increase traffic levels without providing any performance benefit. Accordingly, in order to save power, NACKs can be sent on PW-Wires.

Hereinafter, techniques that apply to write-invalidate bus-based protocol are examined, such as bus-based snooping protocols. The role of the L1s and the L2 in a bus-based CMP system are very similar to that of the L2s and memory in a bus-based symmetric multiprocessor ("SMP") system.

Signal Wires

Three wired-OR signals are typically used to avoid involving the lower/slower memory hierarchy. Two of these signals are responsible for reporting the state of snoop results and the third indicates if the snoop result is valid. The first signal is asserted when any L1 cache, besides the requester, has a copy of the block. The second signal is asserted if any cache has the block in the exclusive state. The third signal is an inhibit signal, asserted until all caches have completed their snoop operations. Once the third signal is asserted, the requesting L1 and the L2 can safely examine the other two signals. Since all three of these signals are on the critical path, implementing them using low-latency L-Wires can improve performance.

Voting Wires

Cache-to-cache transfers may be used if the data is in the shared state in a cache. The Silicon Graphics Challenge and the Sun Enterprise use cache-to-cache transfers for data in the modified state, in which case there is a single supplier. On the other hand, in the full Illinois MESI protocol, a block can be preferentially retrieved from another cache rather than from memory. When multiple caches share a copy, a "voting" mechanism is required to decide which cache will supply the data. This voting mechanism can benefit from the use of low latency wires described herein.

Protocol Independent Optimization of Coherence Traffic

Narrow Bit-Width Operands for Synchronization Variables

Synchronization is an important factor in the performance of a parallel application. Synchronization is not only often on the critical path, but it also contributes a large percentage (up to 40%) of coherence misses. Locks and barriers are the two most widely used synchronization constructs. Both use small integers to implement mutual exclusion. Locks often toggle the synchronization variable between zero and one, while barriers often linearly increase a barrier variable from zero to the number of processors taking part in the barrier operation. Such data transfers have limited bandwidth needs and can benefit from using L-Wires.

This optimization can be further extended by examining the general problem of cache line compaction. For example, if a cache line is comprised mostly of "0 bits", trivial data compaction algorithms may reduce the bandwidth needs of the cache line, allowing it to be transferred on L-Wires instead of B-Wires. Performance improvements are possible if the wire latency difference between the two wire implementations is greater than the delay of the compaction/decompaction algorithm.

Assigning Writeback Data to PW-Wires

Writeback data transfers result from cache replacements or external request/intervention messages. Since writeback messages are rarely on the critical path, assigning them to PW-Wires can save power without incurring significant performance penalties.

Assigning Narrow Messages to L-Wires

Coherence messages that include the data block address or the data block itself are many bytes wide. However, many other messages, such as acknowledgments and NACKs, do not include the address or data block and only contain control information (source/destination, message type, MSHR id, etc.). Such narrow messages can be assigned to low latency L-Wires.

In a conventional multiprocessor interconnect, a subset of wires are employed for addresses, a subset for data, and a subset for control signals. Every bit of communication is mapped to a unique wire. When employing a heterogeneous interconnect, a communication bit can map to multiple wires. For example, data returned by the L2 in response to a read-exclusive request may map to B-Wires or PW-Wires depending on whether there are other sharers for that block. Thus, every wire must be associated with a multiplexer and de-multiplexer.

The decision process in selecting the right set of wires is minimal. For example, an OR function on the directory state for that block is enough to select either B-Wires or PW-Wires. In another embodiment, the decision process involves a check to determine if the block is in the exclusive state. In yet another embodiment, there is a need for a mechanism that tracks the level of congestion in the network (for example, the number of buffered outstanding messages). In still another embodiment, there is a need for logic to compute the width of an operand, similar to logic used in the PowerPC 603, to determine the latency of integer multiply.

Cache coherence protocols are already designed to be robust in the face of variable delays for different messages. In the illustrated embodiments, a data packet is not distributed across different sets of wires. Therefore, different components of an entity do not arrive at different periods of time, thereby eliminating any timing problems.

In a snooping bus-based coherence protocol, transactions are serialized by the order in which addresses appear on the bus. Accordingly, embodiments and appropriate extensions for snooping protocols affect the transmission of address bits (address bits are always transmitted on B-Wires), so the transaction serialization model is preserved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for routing traffic, said method comprising:
providing a processor having an operating portion and a cache with a data block associated with an address, said address being comprised of a plurality of bits;
providing at least a first conductor configured to extend from said operating portion to said cache to supply a first address packet comprised of first selected bits of said plurality of bits of said address from said operating portion to said cache;
providing at least a second conductor configured to extend from said operating portion to said cache to supply a second address packet comprised of second selected bits of said plurality of bits of said address from said operating portion to said cache, wherein said at least a second conductor has a higher latency than said at least a first conductor;
operating said processor to generate said address at said operating portion and directing said first address packet over said at least a first conductor to said cache, and directing said second address packet over said at least a second conductor to said cache;
fetching a plurality of data blocks associated with said first address packet from said cache, and
identifying said data block associated with said address from said plurality of data blocks using said second selected bits.

2. The method of claim 1, wherein said operating said cache further comprises:
matching tags in said data block and said second address packet to identify said data block.

3. A method for routing traffic, said method comprising:
providing a processor having a cluster element and a cache, said cluster element coupled to said cache using an interconnect having a plurality of conductor means;
determining, at said cluster element, an address of a requested data block to be retrieved from said cache;
transmitting a plurality of first selected bits comprising least significant bits of said address from said cluster element to said cache on a first conductor means associated with said interconnect;
accessing at said cache a plurality of data cache blocks, including said requested data block, store in said cache, said plurality of data cache blocks corresponding to said plurality of first selected bits;
transmitting a plurality of second selected bits comprising most significant bits of said address of said requested data block from said cluster element to said cache on a second conductor means associated with said interconnect, wherein said second conductor means has a higher latency than said first conductor means;
identifying said requested data block from said plurality of data cache blocks using said plurality of second selected bits by matching tags in said requested data block and said plurality of second selected bits; and
transmitting said requested data block from said cache to said cluster element.

4. The method of claim 3 wherein said first conductor means comprises a plurality of latency optimal conductors.

5. The method of claim 4 wherein said second conductor means comprises a plurality of low power, high bandwidth conductors.

6. The method of claim 1, further comprising:
providing a heterogeneous interconnect comprising said first conductor and said second conductor, wherein said heterogeneous interconnect is configured to extend from said operating portion to said cache.

7. The method of claim 6 wherein said second data packet has 72 bits further comprising:
configuring said first conductor means as a plurality of L wires; and
configuring said second conductor means as a plurality f B wires.

8. A method for routing traffic from a cluster element over a low bandwidth, low latency interconnect in a processor, said method comprising:
providing a heterogeneous interconnect configured to couple said cluster element to a consuming cluster element, wherein said heterogeneous interconnect comprises said low bandwidth, low latency interconnect;
identifying, at said cluster element, a narrow bit-width data element having a plurality of identifying information and a plurality of bits of data to be communicated from said cluster element to said consuming element over said low bandwidth, low latency interconnect;
determining if said plurality of bits of data may be transmitted on a first conductor associated with said low bandwidth, low latency interconnect based upon the size and configuration of said plurality of bits of data;
compacting said narrow bit-width data element to a bit size such that each bit of said narrow bit-width data element that is compacted is simultaneously communicated over said low bandwidth, low latency interconnect; and
transmitting said narrow bit-width data element that is compacted over said low bandwidth, low latency interconnect to said consuming cluster element.

9. A method for routing traffic in a multi-processor environment, said method comprising:
providing at least a first processor element having a first processor cache coupled thereto, a second processor element having a second processor cache coupled thereto and a back-up L2 cache;
providing a first heterogeneous interconnect having a first plurality of conductors, said first heterogeneous interconnect configured to extend from said first processor cache to said back-up L2 cache;
providing a second heterogeneous interconnect having a second plurality of conductors, said second heterogeneous interconnect configured to extend from said second processor cache to said back-up L2 cache;
providing a third heterogeneous interconnect having a third plurality of conductors, said third heterogeneous interconnect configured to extend from said first processor cache to said second processor cache;
transmitting critical data on latency optimal conductors of said plurality of conductors over said first, second and third interconnect using a directory-based cache coherence protocol; and
transmitting non-critical data on low power, high bandwidth conductors from said plurality of conductors over said first, second and third interconnect using said directory-based cache coherence protocol.

10. The method of claim 9 wherein said critical data comprises an acknowledgement message communicated from said second processor cache to said first processor cache.

11. The method of claim 9, wherein said non-critical data comprises a data block retrieved from said main cache.

12. The method of claim 9, wherein said non-critical data comprises a speculative data reply retrieved from said main cache.

13. The method of claim 9, wherein said non-critical data comprises a write back message transmitted from either said first processor cache or said second processor cache.

14. A method for routing traffic in a multi-processor environment, said method comprising:
providing at least a first processor element having a first processor cache, a second processor element having a second processor cache, a back-up L2 cache and a bus, said first processor cache, said second processor cache and said back-up L2 cache being coupled to said bus;
providing at least one heterogeneous interconnect on said bus, said heterogeneous interconnect including a plurality of conductors;
transmitting at least one control signal on a latency optimal conductor of said plurality of conductors on said bus using a snooping-based cache coherence protocol; and
transmitting data on a low power, high bandwidth conductor of said plurality of conductors on said bus using said snooping-based cache coherence protocol.

15. The method of claim 14 wherein said latency optimal conductor comprises a plurality of L-wires.

16. The method of claim 14 wherein said low power, high bandwidth optimal conductor comprises a plurality of PW-wires.

17. The method of claim 14 wherein said data comprises address information.

18. The method of claim 14 wherein said at least one control signal comprises a signal to assert the result of the snoop.

19. The method of claim 14 wherein said at least one control signal comprises a signal to assert that the snooping operation is complete.

20. The method of claim 14 wherein said at least one control signal comprises a signal to implement a voting mechanism.

* * * * *

UNITED STATES PATENT AND TRADEMARK OFFICE
CERTIFICATE OF CORRECTION

PATENT NO. : 7,478,190 B2  Page 1 of 1
APPLICATION NO. : 11/351528
DATED : January 13, 2009
INVENTOR(S) : Balasubramonian et al.

It is certified that error appears in the above-identified patent and that said Letters Patent is hereby corrected as shown below:

In the Specification

Column 1
Line 4, Insert new paragraph with heading --GOVERNMENT LICENSE RIGHTS This invention was made with government support under CCF0430063 awarded by National Science Foundation. The government has certain rights in the invention.--

Signed and Sealed this
Seventh Day of April, 2015

Michelle K. Lee
*Director of the United States Patent and Trademark Office*